Feb. 10, 1970     D. S. CVACHO     3,494,812
METHOD AND APPARATUS FOR MAKING A CONTAINER
HAVING A SEAMLESS SLEEVE-LIKE LINER
Original Filed April 26, 1966     2 Sheets-Sheet 1
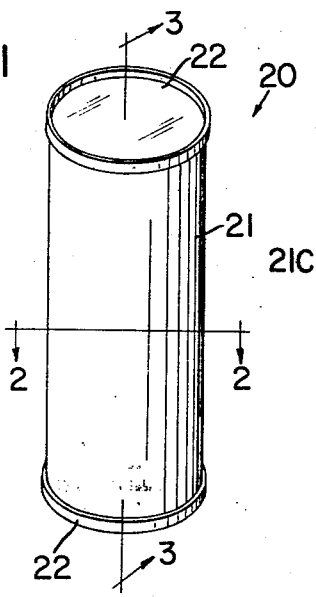
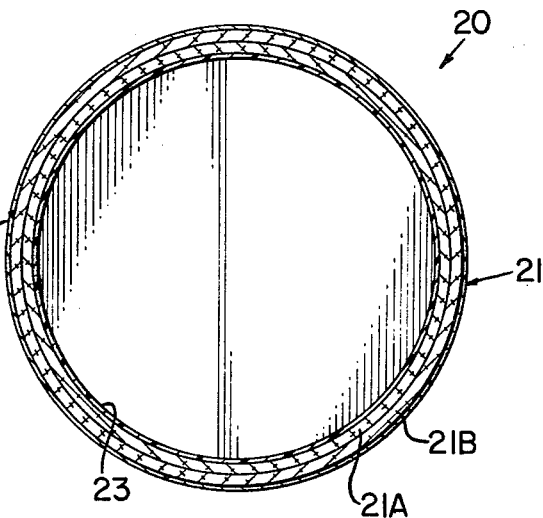
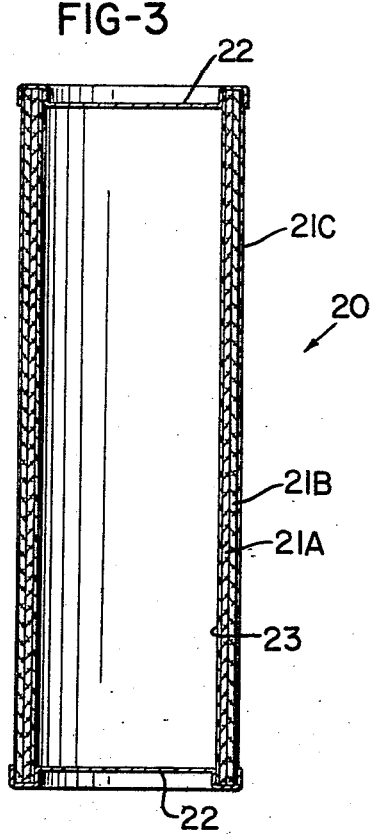
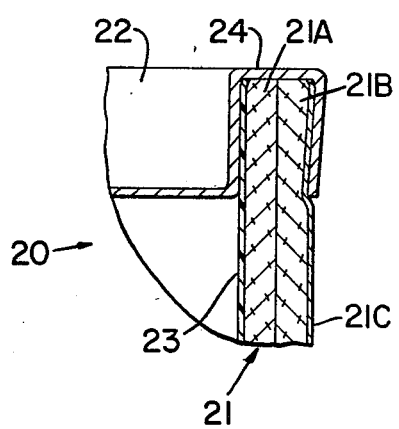
INVENTOR.
DANIEL S. CVACHO
BY *Glenn, Palmer,*
*Matthews & Lyne*
HIS ATTORNEYS

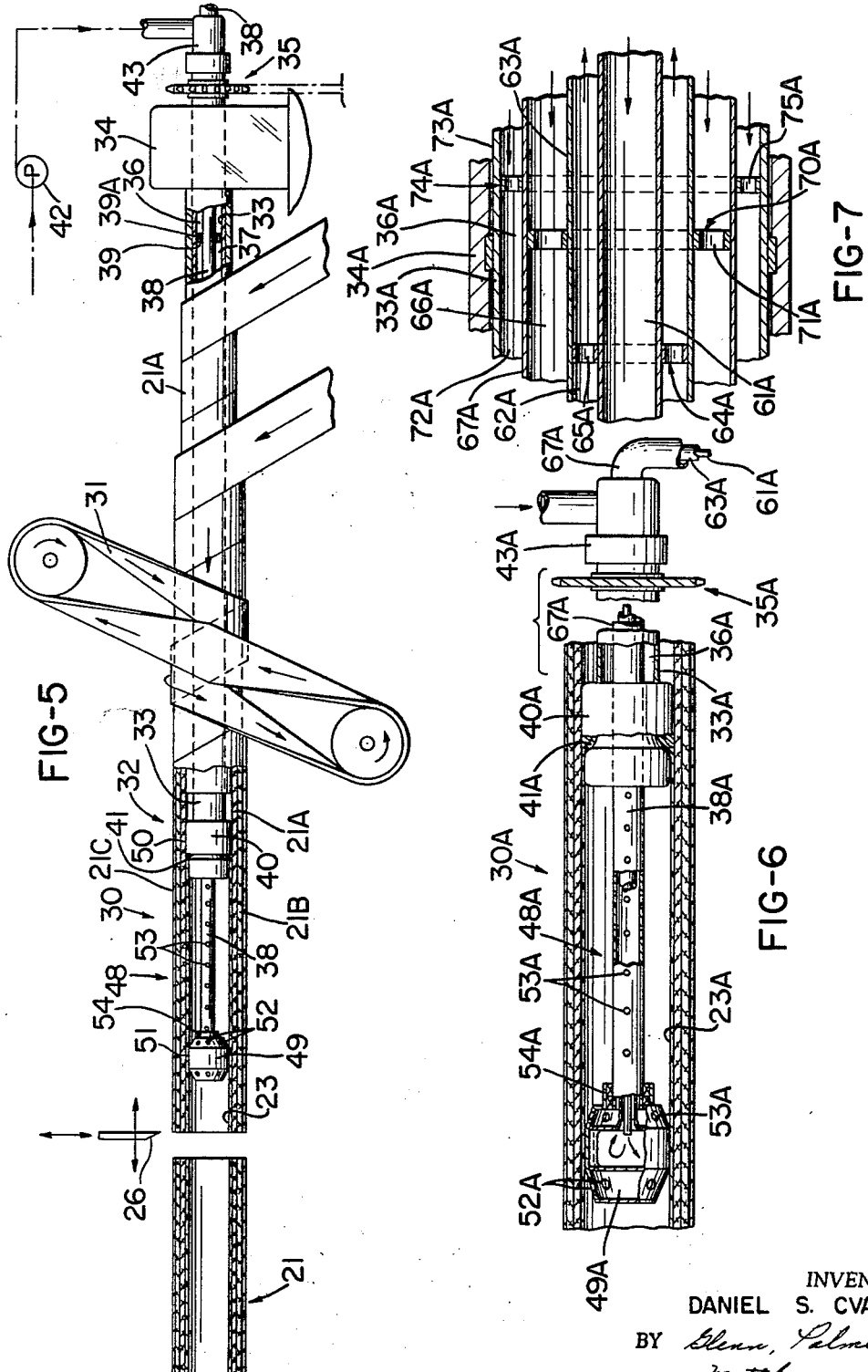

United States Patent Office 3,494,812
Patented Feb. 10, 1970

3,494,812
METHOD AND APPARATUS FOR MAKING A CONTAINER HAVING A SEAMLESS SLEEVE-LIKE LINER
Daniel S. Cvacho, Chesterfield County, Va., assignor to Reynolds Metals Company, Richmond, Va., a corporation of Delaware
Original application Apr. 26, 1966, Ser. No. 545,362, now abandoned. Divided and this application June 17, 1968, Ser. No. 752,086
Int. Cl. B31d 5/00; B29c 17/00; B65h 81/00
U.S. Cl. 156—195                                23 Claims

ABSTRACT OF THE DISCLOSURE

A method and apparatus for making a composite structural wall of a cylindrical container and extruding a seamless sleeve-like liner means within the composite structural wall, the liner means being extruded against the inside surface of the structural wall under pressure.

---

This application is a divisional patent application of its co-pending parent application, Ser. No. 545,362, filed Apr. 26, 1966, now abandoned, and is assigned to the same assignee to whom the parent application is assigned.

This invention pertains to container means and more particularly to an improved container means having seamless sleeve-like liner means and to an improved apparatus and method for making such improved container means.

Cylindrical containers of the type presently used for packaging refrigerated biscuit dough, or the like, are generally formed having a composite outside structural wall and an inner wall surface which does not have optimum sealing characteristics. Furthermore, such current cylindrical containers usually do not provide an adequate seal between the cylindrical side walls and end walls thereof requiring the use of caulking compound or the like to provide such seal to thus assure freshness of the biscuit dough carried within the container. In addition, efforts to produce a container of this type with improved seal characteristics have resulted in excessive container costs.

Accordingly, it is a feature of this invention to provide an improved container means of the character mentioned which can be produced economically and in a continuous mass production operation.

Another feature of this invention is to provide an improved container means having seamless sleeve-like liner means constructed and arranged therewithin to assure an optimum seal for such container means.

Another feature of this invention is to provide an improved container means having side wall means of generally right circular cylindrical outline and having a pair of end wall means at opposite ends thereof which are suitably fastened in position and sealed along their adjoining surfaces without requiring caulking compound or the like.

Another feature of this invention is to provide an improved container means having a seamless sleeve-like liner means therewithin which can be produced in cylindrical container stock of various sizes without expensive alteration of the apparatus and method for making such sleeve-like liner means.

Another feature of this invention is to provide an improved apparatus for making such improved container means which is readily adapted for use with conventional machinery used to make container means of this general type.

Another feature of this invention is to provide an improved apparatus which is economical to construct and efficient to use and which may be used to form sleeve-like liner means in a continuous manner within tubular stock used to form side wall means of container means.

Another feature of this invention is to provide an improved apparatus which enables extruding a seamless sleeve-like liner within an elongated tubular member which is cut to length to form cylindrical side wall means of container means.

Another feature of this invention is to provide an improved apparatus which utilizes fluid pressure to urge a heat-sealable plastic extruded within such elongated tubular member against the inside surface of the tubular member.

Another feature of this invention is to provide an improved apparatus which utilizes extrusion die means adapted for insertion within tubular stock used to form container side wall means and which utilizes sealing-cooling member means cooperating with surfaces of said die means to form pressure chamber means used to urge plastic material extruded within such chamber means against the inside surface of such tubular stock.

Another feature of this invention is to provide an improved apparatus having such sealing-cooling member means which utilizes a separate fluid circulated therewithin to provide improved cooling action of plastic material extruded within such tubular member.

Another feature of this invention is to provide an improved method for economically forming seamless sleeve-like liner means within tubular container stock.

Another feature of this invention is to provide an improved method for forming seamless sleeve-like liner means within an elongated tubular structure simultaneously with the making of such structure.

Another feature of this invention is to provide an improved method utilizing fluid under pressure to urge liner material extruded within an elongated tubular structure against the inside surface of such structure to thereby provide a seamless sleeve adjoining such surface.

Another feature of this invention is to provide an improved method for forming such seamless sleeve-like liner means utilizing a plastic heat-sealable material which is extruded within tubular container stock during the making thereof, such plastic material being urged into engagement with the inside surface of such tubular stock and cooled to provide a continuous adhesive bond.

Another feature of this invention is to provide an improved method employing cooling fluid to more rapidly cool a heat-sealable liner urged against the inside surface of a tubular member.

Another feature of this invention is to provide an improved method for forming a seamless sleeve-like liner means on the inside surface of a tubular structure of a composite nature in which the apparatus and materials used to form and adhesively bond the liner means to such surface are all inserted within such structure from one end of such tubular structure.

Therefore, it is an object of this invention to provide an improved container means and to provide an improved apparatus and method for making such container means having one or more of the novel features of this invention as set forth above or hereinafter shown or described.

Other objects, uses, and advantages of this invention are apparent from a reading of this description which proceeds with reference to the accompanying drawings forming a part thereof and wherein:

FIGURE 1 is a perspective view of elongated cylindrical container means of this invention having the improved seamless sleeve-like liner means defining the inside surface thereof and showing end wall means fastened in position at the top and bottom thereof.

FIGURE 2 is a sectional view on the line 2—2 of FIGURE 1 particularly showing the seamless configuration of the liner means.

FIGURE 3 is a sectional view on the line 3—3 of FIGURE 1.

FIGURE 4 is an enlarged fragmentary sectional view of one corner portion of the container means of FIGURE 1 particularly illustrating the manner of forming an improved seal between the top wall and cylindrical side wall means thereof.

FIGURE 5 is a composite view showing some components schematically and others in elevation with parts broken away illustrating the apparatus and method for making tubular structural wall means used to make side wall means of the improved container means of FIGURE 1 and particularly illustrating improved means used to form the seamless sleeve-like liner means.

FIGURE 6 is a sectional view with parts broken away illustrating another embodiment of improved means used to form seamless sleeve-like liner means within an elongated tubular structure also used to make side wall means of the container of FIGURE 1.

FIGURE 7 is a sectional view of the center portion of the apparatus illustrated in FIGURE 6 particularly illustrating the concentric arrangement of a plurality of tubes inserted one within the other for carrying liner material and fluids used to form such sleeve-like liner means in a more efficient manner.

While the various features of this invention are hereinafter illustrated and described as being particularly adaptable for providing improved container means having cylindrical side wall means with seamless sleeve-like liner means therein such as containers for refrigerated biscuit dough or the like, and to any improved apparatus and method for making container side wall means having such seamless liner therein, it is to be understood that the various features of this invention can be utilized singly or in any combination thereof to provide seamless liner means for side wall means and container means for other uses as desired.

Therefore, this invention is not to be limited to only the embodiment illustrated in the drawings, because the drawings are merely utilized to illustrate one of the wide variety of uses of this invention.

In the exemplary embodiment of this invention illustrated in FIGURES 1–4, container means shown as a right circular cylindrical container 20 adapted for containing refrigerated biscuit dough has been illustrated. Container 20 has the improved seamless sleeve-like liner means of this invention. In addition, in FIGURE 5, an improved apparatus is illustrated for forming the container 20 and in FIGURES 6 and 7 another embodiment of apparatus similar to the apparatus of FIGURE 5 is illustrated.

As shown particularly in FIGURES 1–4, container 20 has elongated cylindrical side wall means or a side wall 21 and a pair of identical end wall means fastened thereto at opposite ends thereof and each designated by the numeral 22. Side wall 21 is a composite wall made up of an outer metallic foil layer 21C, and a pair of intermediate paper layers 21B and 21A and has a seamless sleeve-like liner means or a sleeve-like liner 23 lining the entire inside surface thereof and adjoining surface 21A.

The liner 23 extends the full length, or height as shown in this example, of container 20. Each end wall 22 has a generally U-shaped peripheral edge 24 (see FIGURE 4) which is adapted to receive an associated terminal end portion of elongated cylindrical side wall 21 and hence an associated portion of liner 23. The parallel sides of each U-shaped edge 24 are compressed inwardly, as by mechanical swaging; and, the clamping action of each U-shaped edge 24 against liner 23 assures that an optimum seal is provided between side wall 21 and end wall 22 at each end of container 20.

The liner 23 may be made of any suitable material which can be extruded and may be metallic, plastic or the like. In this example of the invention, liner 23 is made of a plastic material, which is heat-sealable and which is extruded while in a hot fluid condition, against the inside surface of tubular stock from which each side wall means 21 is cut, such that upon contact and cooling it is adhesively bonded to the inside surface of wall 21. Plastic liner 23 is urged radially against the inside surface of cylindrical side wall 21 using fluid pressure and using the apparatus as will be described subsequently in more detail.

The side wall means 21 of each container 20 is preferably formed in a continuous manner, as will be apparent in FIGURE 5, from an elongated tubular structure and cut to the desired length practically simultaneously with the formation of such structure. The elongated structure is cut to length using knife means shown schematically as a knife edge 26. Knife edge 26 is lowered into cutting position as determined by the desired length of side wall 21 and the rate of travel of the elongated tubular structure as it is being continuously formed using the apparatus of FIGURE 5.

The exemplary apparatus for forming side wall 21 of container 20 shown in FIGURE 5 comprises means for spirally winding a plurality of web means together to form an elongated tubular structure indicated generally by the numeral 30. Tubular structure 30, in this example, comprises an inner spirally wound web 21A with a central paper web 21B spirally wound over and adhesively bonded to the inner web 21A. An outer layer of metallic foil 21C is provided and adhesively bonded to web 21B.

Tubular structure 30 is formed in a known manner and employs belt means illustrated as a belt drive 31, to rotate and advance the spirally wound structure to the left, as shown in FIGURE 5, as such structure is formed. Practically simultaneously with the formation of structure 30, sleeve-like liner 23 is formed in a continuous manner therewithin.

Forming means is provided for forming seamless sleeve-like liner means 23 within tubular structure 30 and such forming means is indicated generally at 32. Forming means 32 comprises rotatable spindle means shown as a rotatable spindle 33 which is supported within the elongated tubular structure 30. Spindle 33 is supported by a spindle or mandrel support illustrated at 34 which supports such spindle in a cantilever manner within structure 30 while permitting rotation thereof. Rotating means is provided for rotating spindle 33 and comprises a chain drive assembly, a portion of which is illustrated in FIGURE 5, and such drive assembly is indicated generally by the numeral 35.

Spindle 33 has passage means or a passage 36 extending axially therealong, and in this example of the invention, spindle 33 is of a tubular configuration formed of a comparatively thin wall structure having a circular ring-like cross-sectional outline.

Spindle 33 supports means in the terminal end portion thereof adapted for extruding sleeve-like liner 23 within structure 30. Such means comprises lining means such as extrusion die means shown in this example as a die 40 adapted for extruding a hot plastic material therethrough. Die 40 in this example has an annular opening or orifice 41 extending through a 360° arc around the outer periphery thereof and adjacent its terminal end.

As previously mentioned, sleeve liner 23 in this example of the invention is a plastic heat-sealable material and such material is conveyed in a heated liquid state through conveying means within passage 36 of spindle 33, through orifice 41, and against the inside surface of the structural wall means 30 to thereby form the seamless sleeve-like liner 23.

The conveying means comprises an annular passage 37 defined by the outside cylindrical surface of a tubular conduit 38 supported concentrically within passage 36 and the inside surface of tubular spindle 33 which defines passage 36. Conduit 38 is supported within passage 36 by a plurality of spaced apart annular washers 39 arranged along conduit 38. Each washer 39 has opening means or openings 39A extending therethrough generally parallel to the central axis of such washer enabling the heated plastic material to be conveyed through annular passage 37 under pressure. Suitable passage means is provided for conveying the plastic material from annular passage 37 to die 40 and through annular opening 41 thereof.

As previously mentioned die 40 is supported by the terminal end portion of spindle 33. Spindle 33 and thus die 40 with its annular orifice 41 are all rotated within tubular structure 30 during the forming of such structure. The plastic forming liner 23 is suitably heated to form a liquid and pumped using pump means illustrated at 42 through a suitable rotary joint device illustrated at 43 and along annular passage 37 preferably while spindle 33 is rotating. The annular orifice 41 in extrusion die 40 is constructed and arranged so that together with the rotation thereof hot plastic material extrudes therefrom in a frusto-conical pattern thereby forming a sleeve-like structure.

The extruded hot plastic material is urged against the entire inside surface of elongated tubular structure 30 in a seamless manner to form liner 23 using a fluid such as air under pressure which is conveyed through the passage in tubular conduit 38. Conduit 38 is arranged concentrically within passage 36 and supported by washers 39 as previously described. Conduit 38 extends through the terminal end of extrusion die 40 and the air under pressure is released from conduit 38 so as to urge the hot plastic extruded through orifice 41 in sealing relation against the inside surface of structure 30. The air conveyed through conduit 38 is preferably pressure regulated using suitable pressure regulator means, not shown. In addition, such air is isolated from the hot plastic using suitable means in the rotary joint 43 as well as in extrusion die 40.

To assure that the pressurized air is utilized effectively adjacent orifice 41, a pressure chamber indicated generally by the numeral 48 is created within tubular structure 30 along a limited section or portion downstream of orifice 41. Pressure chamber 48 is formed between the terminal end of die 40 and a seal member 49 spaced apart therefrom. Die 40 has an outer peripheral sealing surface 50 upstream of orifice 41 which provides a seal at one end of chamber 48.

Sealing member 49 has a suitable sealing surface 51 at its peripheral edge forming a suitable seal at the opposite end of chamber 48.

Seal 49 is a sealing-cooling member which is preferably free-revolving and has a plurality of bleed orifices 52 therein. The bleed orifices 52 are spaced and sized so that the air pressure in chamber 48 and the bleeding of air therefrom are both controlled within desired limits.

Air supply conduit 38 in this example is centrally arranged and extends practically the entire length of chamber 48. That portion of conduit 38 within chamber 48 has a plurality of spaced apart holes 53 extending axially therealong which provide air at the center portion of chamber 48 along the limited length between die 40 and the free-revolving member 49. This arrangement assures air pressure distribution along the full length of chamber 48 and further assures that air flow is generally from the center radially outwardly toward the inside surface of tubular structure 30.

Member 49 is supported on the terminal end of conduit 38 on suitable bearing means or bearings 54. Bearings 54 enable member 49 to revolve freely thereabout as tube structure 30 is continuously formed yet an adequate sealing surface is maintained at surface 51 to assure the pressure within chamber 48 is controlled within desired limits.

Thus, it will be seen from FIGURE 5 that an elongated tubular structure 30 is formed in a continuous manner. Practically simultaneously with the formation of structure 30 a plastic heat-sealable material is extruded through die 40 and in a sleeve-like manner into chamber 48. The sleeve-like effect during such extrusion is produced by rotating the die 40 using drive 35. As the hot plastic material is extruded air pressure acts thereagainst and urges such material firmly against the inside surface of structure 30. As tubular structure is rotated the portion with newly extruded plastic is moved past free-revolving seal member 49.

Seal 49 at this point not only assures that the heat-sealable plastic is held against the inside surface of structure 30 but also provides some cooling action therefor provided as air bleeds through orifices 52. This action, of course, assures a better adhesive bond between structure 30 and the plastic material forming seamless liner 23.

With liner 23 suitably bonded within structure 30 it is then cut to the desired lengths by knife means 26. Each length forming side wall 21 of container 20 as previously described.

It will be understood from the above description of the apparatus and method of making structure 30 that the elongated plastic sleeve liner 23 extends along the full length of side wall 21.

The embodiment of this invention illustrated in FIGURES 6 and 7 is basically identical to the embodiment illustrated in FIGURE 5, with the exception that, in this latter embodiment, separate fluid means is provided for circulation through the rotary seal means. Therefore, those portions of this latter apparatus generally identical to the apparatus of FIGURE 5 will not be redrawn or described again since it would be basically a repetition of the previous presentation. Those portions of this latter embodiment of the invention which are basically different are shown in FIGURES 6 and 7 and will be described in detail with new reference numerals. Portions illustrated in FIGURES 6 and 7 and basically identical to the previously described structure will be given the same reference numeral as before followed in this latter instance by the letter A and not described again in detail.

In the embodiment of FIGURES 6 and 7 separate fluid is provided for circulation through sealing-cooling member 49A, while in the example of FIGURE 5, air flow through orifices 52 of sealing member 49 provides some cooling action. In this latter example, a fluid such as water is utilized for circulation through sealing-cooling member 49A to provide improved cooling of the plastic material after it has been urged radially against the inside surface of tubular structure 30A by the air within chamber 48A, as well as provide improved cooling of member 49A itself. Member 49A is a free-rotating seal supported for rotation on suitable frictionless bearing device 54A.

Water is provided from a suitable source and circulated through member 49A under pressure using suitable pumping means. The internal porting arrangement within member 49A is such as to provide optimum cooling action. In addition the rate of flow of water through member 49A and the tempertaure of such water is also closely controlled for optimum cooling.

Water is conveyed to seal 49A through tubular passage 36A of spindle 33A by a centrally arranged water conduit 61A and returned through an annular passage 62A provided between the outside surface of conduit 61A and another conduit 63A arranged concentrically thereabout. Conduits 61A and 62A are suitably held spaced apart so as to define the annular water return passage 62A therebetween by a plurality of annular washers 64A suitably fastened in spaced apart relation along conduit 61A. Each washer 64A has passage means or passages therein generally parallel to its central axis and indicated generally by the numeral 65A. The passages 65A enable the return flow of water through annular passage 62A.

In a similar manner, air is provided through an annular passage 66A defined by a conduit 67A arranged concentrically about conduit 63A. Conduit 63A has a plurality of annular washers 70A suitably fastened therealong in spaced apart relation to hold conduit 67A in position. Washers 70A are similar to washers 64A and have similar holes 71A enabling the flow of air along annular passage 66A.

The hot plastic material in this latter embodiment of the invention is provided through an annular passage 72A defined by a conduit 73A arranged concentrically about conduit 67A. Conduit 73A is spaced and held radially apart from and supported on conduit 67A by a plurality of spaced apart ring-like washers 74A having a plurality of passages thereabout and indicated generally by the numeral 75A. Washers 74A and passages 75A are similar to washers 64A and associated passages 65A respectively as previously described. Passages 75A enable flow of hot plastic material along annular passage 72A.

Thus, it is seen that the conduits 61A, 63A, 67A, and 73A are all arranged in a concentric manner within passage 36A of spindle 33A and held spaced apart by special washers 64A, 70A, and 74A to enable fluid flow through annular passages 62A, 66A, and 72A respectively.

While in this embodiment of the invention sealing-cooling member 49A is shown with water circulating therethrough it will be appreciated that any other suitable fluid, liquid or gas, could be similarly used to provide improved cooling action. The improved cooling action results in improved further cooling of the liner material against the inside surface of structure 30A thereby providing a better adhesive bond for plastic liner 23A.

In this embodiment of the invention, the means for forcing or pumping water, air, and hot plastic through their respective passages are not completely shown in detail. It will be appreciated that such pumping may be accomplished in any known manner using suitable means.

Having described the exemplary apparatus and method of this invention in detail, a brief general resume will now be presented to highlight its unique features.

A composite structural wall forming side wall 21 of container 20 is first made in the form of an elongated tubular structure 30. Means is provided for forming a sleeve-like liner within the elongated tubular structure 30 and such means includes extruding a material, such as a heat-sealable plastic material, within the tubular structure 30 in a sleeve-like form. Through the unique application of air pressure such sleeve-like form is urged outwardly against the inside surface of structure 30, so as to form a continuous seamless liner within such structure. The air pressure is exerted basically in a chamber provided at the terminal end of extrusion die means through which the heat-sealable plastic is extruded. The chamber is defined by a free-rotating sealing-cooling member at one end thereof and the extrusion die at the other end of such chamber. The pressure within such chamber is controlled to assure optimum pressure distribution within such chamber and optimum sealing of the extruded sleeve in a seamless manner against the inside surface of tubular structure 30. Means is provided for circulating either the same fluid used in chamber 48 or a separate fluid through the sealing-cooling member to provide an optimum adhesive bond between heat-sealable liner 23 and the inside surface of tubular structure 30. The elongated tubular structure 30 is then cut by knife means into the desired lengths as required to form side wall means 21 of container 20 and such cutting is accomplished in an automatic and sequential manner in cooperation with the rate of travel of structure 30 as it is being formed and with the rate at which the seamless sleeve-like liner is also simultaneously formed with structure 30. With structure 30 cut to length to form side wall 21, end wall means 22 are preferably swaged in position around the opposite ends of such side wall 21 to provide an improved seal without requiring caulking compound or the like.

While the outside structural member 30 in this example of the invention has been formed by spirally winding a pair of webs in a known manner, it will be appreciated that the apparatus and method of this invention can be employed for forming seamless sleeve-like liner means within outside structural wall means irrespective of the manner in which such outside structural wall means is formed. Therefore, such outside structural wall means may be formed spirally, convolutely, or in any other desired manner.

Improved containers of this invention for refrigerated biscuit dough of 12 ounces, 32 ounces, and larger, for example, have been successfully made while using the apparatus and method of this invention. It will be appreciated that such improved containers of practically any size may be formed as desired.

In addition, the members 49 or 49A of this invention may be modified to suit the particular container 20 being formed both as to length and cross-sectional configuration. A long member may be used, whether with a separate fluid or the same fluid to provide improved sealing-cooling action. For example, members of 6 to 18 inches have been used. Of course such members may be shorter or longer for any given diameter depending upon the amount of cooling which is desired as determined by the material being used to form the inside liner. Thus, for greater cooling action a longer seal may be provided and fluid pumped to such seal may also be controlled in temperature.

Terms such as "top," "bottom," "side wall," "end wall," etc., have been used in this disclosure of the invention to merely define wall means of the container means of this invention as illustrated in the drawings. It will be appreciated that such container means may be arranged in any desired manner and that the use of such terms should not be considered as limiting the scope of the invention in any way.

Tubular structures 30 and 30A in this example of the invention are both formed by spirally winding a plurality of webs of material in overlapping relation. It will be appreciated that such webs in each tubular structure are preferably fastened together using adhesive means such as glue or the like. The heat generated by the hot liquid plastic material extruding through extrusion die means 40 and 40A helps set the adhesive means and provides a stronger bond between the overlapping webs.

In addition, the rate at which hot plastic material is extruded to form the sleeve-like liner may also be controlled to precisely control the thickness of such liner. Thus, for any given rate of forming the elongated tubular structure, the thickness of the liner may be decreased or increased merely by respectively decreasing or increasing the amount of plastic material extruded. During extrusion of a comparatively small amount of hot plastic material, the movement of the tubular structure helps to stretch the plastic to form a liner having the desired thinness.

The expression "end wall means" has been used throughout the specification and claims of this invention. It will be appreciated that such expression is fully applicable to container means having a pair of end wall means or end walls at opposite ends of composite tubular side wall means as well as to container means having such end wall means at only one terminal end of such tubular side wall means.

Thus, it is seen that an improved container means having improved seamless sleeve-like liner means in side wall means thereof has been provided efficiently and economically and in which such seamless sleeve-like means is also adapted to provide an improved seal between such side wall means and end wall means of such container means.

Further, this invention provides an improved apparatus and method for forming a seamless sleeve-like liner means within a tubular structure used to form container side wall means, such liner means being formed practically simultaneously with formation of such tubular structure.

While the form of the invention now preferred has been disclosed as required by statute, other forms may be used, all coming within the scope of the claimed subject matter which follows.

What is claimed is:

1. An apparatus for making side wall means of container means having seamless sleeve-like liner means lining the inside surface thereof comprising means for making composite structural wall means comprising said side wall means and forming means for forming said sleeve-like liner means in a seamless manner within said structural wall means, said forming means comprising elongated spindle means having passage means extending axially therealong and being adapted to convey material means comprising said sleeve-like liner means, supporting means for supporting said spindle means within said composite structural wall means, and lining means for lining the inside surface of said structural wall means with said material means to define said sleeve-like liner means, said lining means comprising extrusion die means supported by said spindle means adjacent the terminal end portion thereof with said die means communicating with said passage means, said die means having opening means around the outer periphery thereof and arranged immediately adjacent the inside surface of said structural wall means, said die means extruding said material means through said opening means and directly against said inside surface.

2. An apparatus as set forth in claim 1 in which, said spindle means is rotatable and supported for rotation by said supporting means, said opening means comprises annular opening means adjacent the terminal end of said die means for extruding said material means in a frusto-conical pattern therefrom, and said forming means further comprising rotating means for rotating said spindle means and urging means having means adjacent the inner end of said extrusion die means for engaging and urging said material means extruded through said opening means more firmly against said inside surface.

3. An apparatus as set forth in claim 1 in which said forming means further comprises a chamber forming member supported within said structural wall means in spaced apart relation from the terminal end portion of said die means and cooperating therewith to define a fluid pressure chamber and further comprising means for supplying fluid under pressure into said chamber to urge said material means more firmly against the inside surface of said structural wall means.

4. An apparatus as set forth in claim 1 in which said forming means further comprises an elongated supporting member supported within said structural wall means in spaced apart relation from the terminal end of said die means with said supporting member having fluid opening means therein and a chamber forming member supported on the terminal end of said elongated supporting member, said chamber forming member cooperating with the terminal end portion of said die means to define a fluid pressure chamber, and further comprising means for supplying fluid under pressure through said fluid opening means into said chamber to urge said material means more firmly against the inside surface of said structural wall means.

5. An apparatus as set forth in claim 4 in which, said material means comprises a heat-sealable plastic material extruded through said die means while heated, said fluid comprises air under regulated pressure, said chamber forming member comprises a sealing-cooling member having orifice means therein for providing controlled bleeding of air from said chamber while providing sufficient pressure therewithin to urge said heat-sealable plastic material against the inside surface of said structural wall means, and said sealing-cooling member provides added cooling of said plastic material while it is urged against the inside surface of said structural wall means to provide a better bond for said liner means.

6. An apparatus as set forth in claim 5 further comprising conduit means for providing a separate fluid to said sealing-cooling member to enable more efficient cooling of said plastic material.

7. An apparatus as set forth in claim 5 and further comprising conduit means carried concentrically within said passage means and within said elongated supporting member for flowing a separate fluid to and from said sealing-cooling member.

8. A method of making side wall means of container means having seamless sleeve-like liner means lining the inside surface thereof comprising the steps of making composite structural wall means in the shape of a tubular structure and extruding plastic material means directly against the inside surface of said structural wall means using associated extrusion die means to define sleeve-like liner means.

9. The method as set forth in claim 8 comprising the further steps of cutting said composite structural wall means and sleeve-like liner means into tubular sections with each section defining said side wall means, and fastening end wall means to each tubular section to define said container means in which said sleeve-like liner means provides an optimum seal therealong and improved seal means between said side wall means and said end wall means.

10. The method as set forth in claim 8 in which said step of making composite structural wall means comprises spirally winding a plurality of webs of material means with portions thereof in overlapping relation.

11. The method as set forth in claim 8 in which said extruding step comprises conveying said material means in the form of a heat-sealable plastic material in hot liquid form to said die means through passage means provided in spindle means supporting said die means and extruding said heat-sealable material through said extrusion die means.

12. The method as set forth in claim 8 in which said extruding step comprises extruding a heat-sealable plastic material which is in a hot liquid state directly against said structural wall means and comprising the further step of cooling said liquid plastic material to normal ambient temperatures causing it to solidify and bond against said structural wall means forming said sleeve-like liner means.

13. The method as set forth in claim 12, in which said cooling step comprises supporting a sealing-cooling member within said sleeve-like liner means in spaced apart relation from said die means and supplying said member with a cooling fluid to provide improved cooling during said cooling step, said sealing-cooling member also serving to urge said heat-sealable material against said structural wall means.

14. The method as set forth in claim 13 and comprising the further step of urging said heat-sealable plastic material more firmly against the inside surafce of said structural wall means using associated fluid means.

15. The method as set forth in claim 12 and comprising the further steps of supporting a chamber forming member within said structural wall means and sleeve-like liner means in spaced apart relation from the terminal end portion of said die means and cooperating therewith to define a fluid pressure chamber therebetween and supplying a fluid under pressure into said chamber to thereby radially urge said heat-sealable plastic material more firmly against the inside surface of said structural wall means to form said liner means.

16. The method as set forth in claim 15 in which said supplying step comprises supplying air under regulated pressure into said chamber.

17. The method as set forth in claim 15 in which said step of supporting a chamber forming member comprises supporting a sealing-cooling member having orifice means therein, said supplying step comprises supplying air under pressure into said chamber while allowing said orifice means to provide controlled bleeding from said chamber and thereby provide better cooling of said liner means against the inside surface of said structural wall means as well as regulating the pressure within said chamber.

18. The method as set forth in claim 17 and comprising the further step of conveying a separate fluid to said sealing-cooling member to provide improved cooling of the liner means extruded within said structural wall means.

19. An apparatus as set forth in claim 7 in which said separate fluid means comprises cooling water and said conduit means comprises water supply and return conduit means.

20. An apparatus as set forth in claim 1 and further comprising a sealing-cooling member supported within said structural wall means in spaced apart relation from the terminal end portion of said die means and cooperating therewith to define a fluid pressure chamber, and means for supplying fluid under pressure into said chamber to urge said material means which is in the form of a heat-sealable plastic material more firmly against the inside surface of said structural wall means, said sealing-cooling member providing added cooling of said heat-sealable plastic material while it is urged against said structural wall means to provide a better bond for said liner means.

21. An apparatus as set forth in claim 20 and further comprising an elongated supporting member having one end supported in a cantilevered manner against said die means, said elongated supporting member supporting said sealing-cooling member in a free revolving manner about an axis coinciding with the longitudinal axis of said structural wall means.

22. The method as set forth in claim 13 in which said step of supplying said sealing-cooling member with a cooling fluid comprises supplying said sealing-cooling member with cooling water.

23. The method as set forth in claim 18 in which said conveying step comprising supplying cooling water to said sealing-cooling member.

References Cited

UNITED STATES PATENTS

| | | | |
|---|---|---|---|
| 3,376,180 | 4/1968 | Larson et al. | 156—195 |
| 3,376,181 | 4/1968 | Larson et al. | 156—244 XR |
| 2,502,638 | 4/1950 | Becht | 156—195 XR |
| 1,676,351 | 7/1928 | Robinson | 156—500 XR |

PHILIP DIER, Primary Examiner

U.S. Cl. X.R.

18—14; 93—80, 94; 138—144; 156—244, 287, 311, 382, 425, 498, 500; 264—95